No. 737,839. Patented September 1, 1903.

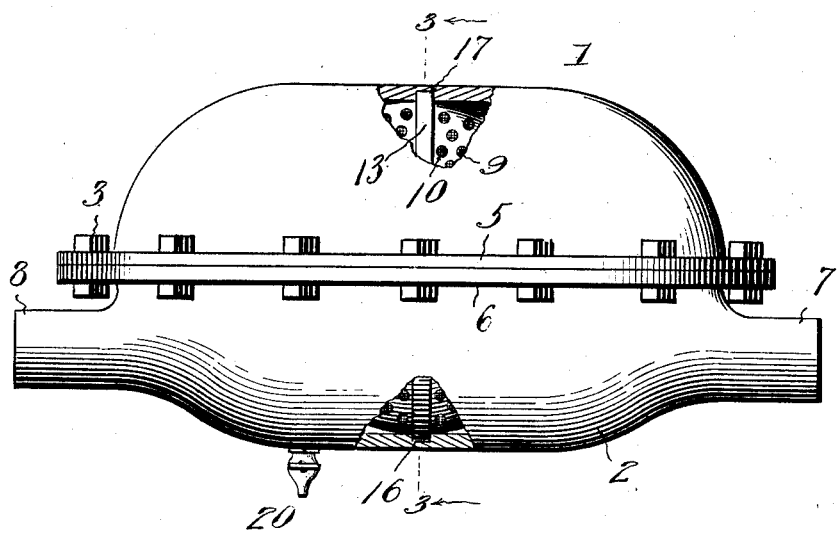
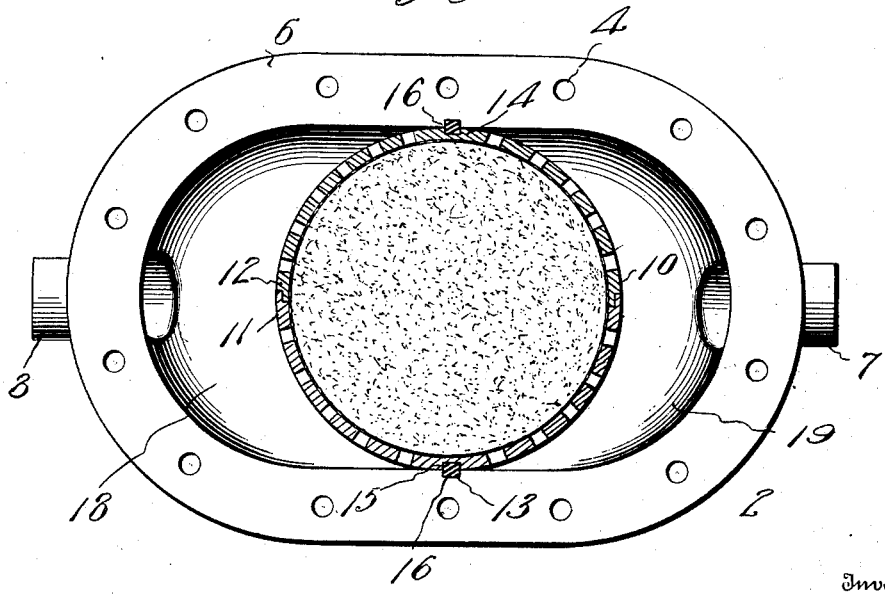

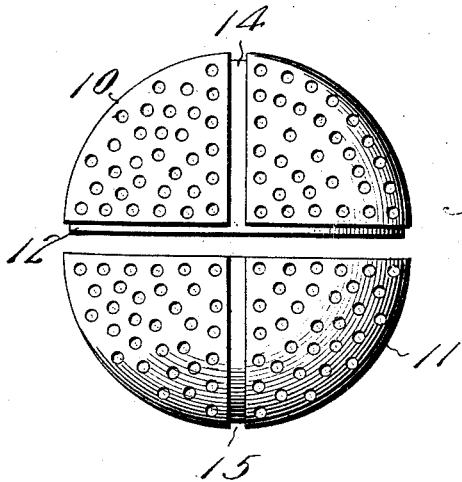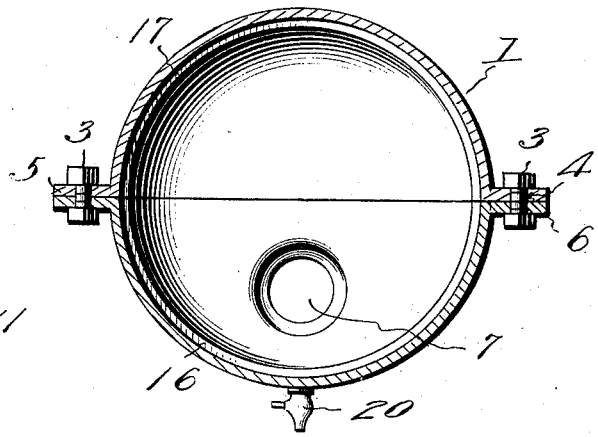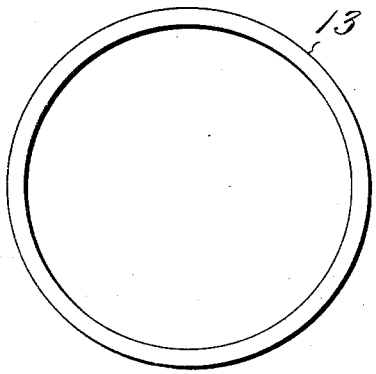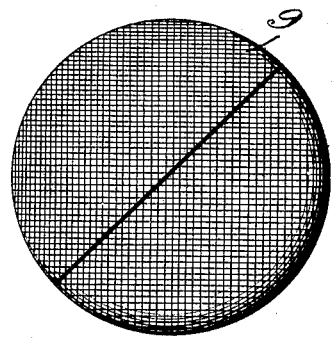

UNITED STATES PATENT OFFICE.

WILLIAM H. HODSHON, OF DANBURY, CONNECTICUT.

FILTER.

SPECIFICATION forming part of Letters Patent No. 737,839, dated September 1, 1903.

Application filed December 17, 1902. Serial No. 135,561. (No model.)

*To all whom it may concern:*

Be it known that I, WILLIAM H. HODSHON, a citizen of the United States, residing at Danbury, in the county of Fairfield and State of Connecticut, have invented new and useful Improvements in Filters, of which the following is a specification.

This invention relates to filters; and the object thereof is to provide an improved construction of filter which will be capable of being readily taken apart and assembled for the purpose of repairs or cleaning.

The invention consists in certain parts and combinations of parts to be referred to hereinafter and illustrated in the accompanying drawings, in which—

Figure 1 is a side elevation of a filter constructed in accordance with my invention, parts being broken away to show the interior construction. Fig. 2 is a top plan view of the lower half of the casing, the shell or holder for the filtering material being shown in section. Fig. 3 is a transverse sectional view through the shell on the line 3 3 of Fig. 1. Fig. 4 is a disassociated view of the holder for the filtering material. Fig. 5 is a plan view of the ring or gasket holding the two halves of the holder for the filtering material. Fig. 6 is a plan view of a lining for the holder.

The reference-numerals 1 and 2 designate the upper and lower halves of an outer shell or casing and which are secured together by bolts or fastening devices 3, which pass through alining openings 4 in the coinciding parallel outwardly-projecting flanges 5 and 6, which extend laterally from the edge of each casing-section. When the two sections are brought together, they form an approximately elongated cylindrical shell or casing having an inlet 7 and an outlet 8, formed with the respective ends of the lower section of the shell.

The filter is of the type wherein a granular body is used and the materials—such as charcoal, sand, soapstone, and gravel or other suitable materials—are contained within the lining 9, which comprises two semispherical bodies, the edge of one fitting within the other and composed of a wire mesh of sufficient fineness to hold the interior granular material which may be contained within the sphere formed by bringing the two members together, as shown in Fig. 6. This lining is surrounded by a holder or shell comprising two perforate semispherical sections 10 and 11, one of which is provided with a flange 12, fitting in a corresponding groove in the opposite member, so that when the two members are brought together a sphere is formed, completely enveloping the lining. These semispherical members are held together by a rubber ring or gasket 13, which is seated in the lining-grooves 14 and 15, running at right angles to the edges of the members 10 and 11. The gasket 13 also rests in the semicircular grooves 16 and 17 of the semicylindrical members 1 and 2 of the outer shell. These grooves are arranged intermediate the ends of the members 1 and 2, so that the granular material held within the lining and holder will be retained in a compact form.

By arranging the spherical holder within the shell and intermediate its ends two end chambers 18 and 19 are formed, which are partitioned from each other by the sphere, through which the water must pass during the process of filtering. The water can be admitted through one of the ends 7 or 8 and will pass through the perforations in the shell and its lining and through the filtering material, whereby all impurities will be removed, and then pass out through the other end of the shell.

It will be noticed that by providing a spherical holder the convex surface of the sphere will present a greater surface to be acted upon than if a holder were provided with parallel walls, thus permitting the water to pass through and only retarding the impurities. It will also be apparent that the device may be readily taken apart for repairs or in order to be cleaned. In the lower portion of the shell is a relief-valve 20, which can drain the water within the filter when desired.

Having thus described the invention, what is claimed as new, and desired to be secured by Letters Patent, is—

1. A filter comprising two approximately semicylindrical members, having alining grooves therein, of a spherical partition within the casing formed by the two members and having perforations, a filtering material within the partition, and a ring surrounding the partition and extending into the grooves in the casing.

2. A filter comprising an internally-grooved cylinder, a holder for containing the filtering material comprising two semispherical members having perforate walls, and grooves at right angles to the edges of a ring fitting in the grooves in the holder, whereby the two members are held together, the outer periphery of the ring resting in the groove in the cylinder.

In testimony whereof I affix my signature in presence of two witnesses.

WILLIAM H. HODSHON.

Witnesses:
FREDERICK STONE,
THERON S. DURANT.